(12) United States Patent
Rawlinson (10) Patent No.: US 9,033,085 B1
(45) Date of Patent: May 19, 2015

(54) SEGMENTED, UNDERCARRIAGE MOUNTED EV BATTERY PACK

(71) Applicant: Atieva, Inc., Redwood City, CA (US)

(72) Inventor: Peter Dore Rawlinson, Worcestershire (GB)

(73) Assignee: Atieva, Inc., Menlo Park, CA (US)

( * ) Notice: Subject to any disclaimer, the term of this patent is extended or adjusted under 35 U.S.C. 154(b) by 0 days.

(21) Appl. No.: 14/185,730

(22) Filed: Feb. 20, 2014

(51) Int. Cl.
*B60K 1/04* (2006.01)
*B60L 11/18* (2006.01)

(52) U.S. Cl.
CPC ......... *B60L 11/1877* (2013.01); *B60L 11/1879* (2013.01)

(58) Field of Classification Search
CPC ............... B60K 2001/0405; B60K 2001/0438; B60K 1/04; B62D 21/157; B62D 25/2036; B62D 25/20; B62D 25/025; B60L 11/1877; B60L 11/1879
USPC ................................................ 180/68.5, 65.1
See application file for complete search history.

(56) References Cited

U.S. PATENT DOCUMENTS

| | | | |
|---|---|---|---|
| 2006/0237248 A1* | 10/2006 | Hayashi | 180/68.5 |
| 2012/0043147 A1* | 2/2012 | Milner et al. | 180/68.5 |
| 2012/0160583 A1 | 6/2012 | Rawlinson | |
| 2012/0161472 A1 | 6/2012 | Rawlinson et al. | |
| 2013/0088044 A1 | 4/2013 | Charbonneau et al. | |

* cited by examiner

*Primary Examiner* — Brodie Follman
*Assistant Examiner* — Brian Cassidy
(74) *Attorney, Agent, or Firm* — Patent Law Office of David G. Beck (57) ABSTRACT

An undercarriage-mounted battery pack is provided that includes a foot well cavity that is aligned with the foot well corresponding to one or more of the vehicle's seats, e.g., the rear vehicle seats. A portion of the battery pack is located in front of the foot well cavity while a second portion is located behind the foot well cavity, where the two portions are coupled together using conduits. The bottom surface of the battery pack may be shaped in order to minimize drag and enhance the flow of air under the vehicle. The battery pack may include cross-members, either interposed between battery subassemblies or incorporated into the subassembly enclosures, to increase side impact resistance and provide further protection to the batteries within the pack as well as the vehicle's occupants.

12 Claims, 8 Drawing Sheets

FIG. 19 ers both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

SEGMENTED, UNDERCARRIAGE MOUNTED EV BATTERY PACK

FIELD OF THE INVENTION

The present invention relates generally to electric vehicles and, more particularly, to a system for providing increased occupant space within the passenger compartment of an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

Figure 1:
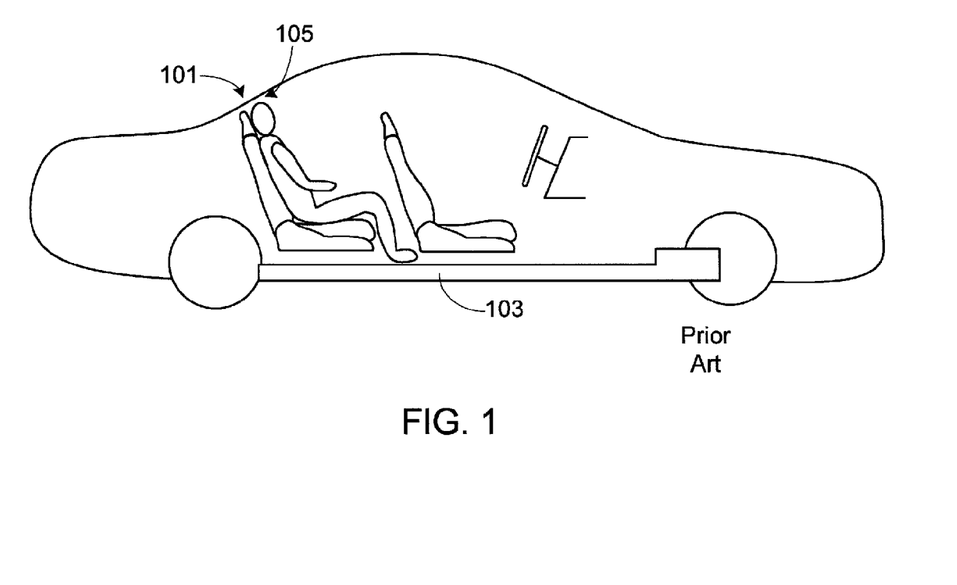
FIG. 1 provides a cross-sectional view illustrating the ergonomic limitations that result from the inclusion of a conventional, undercarriage mounted battery pack.

In a conventional vehicle with a large battery pack, such as that typically required for an all-electric or hybrid vehicle with a relatively long electric-only range, the battery pack is normally mounted under the vehicle. This mounting location is generally considered to be optimal, both from a packaging point of view as well as from a vehicle performance point of view in terms of providing a low center of gravity and a desirable weight distribution. Unfortunately due to the thickness of a typical electric vehicle battery pack, mounting the battery pack under the vehicle significantly impacts available passenger space. As illustrated in FIG. 1, these effects are most noticeable in the back seat due to the sloping roofline 101 and the limited leg space in front of the rear seats. In a typical vehicle with an undercarriage mounted battery pack 103, passengers in the rear seats have limited headroom 105. Additionally, due to the raised floor, the passenger's feet are placed higher than desired, causing the passengers to sit with their legs in a semi-raised, awkward position. While it would be possible to alter and raise roofline 101 in order to provide more legroom as well as more headroom 105, except for SUVs and similarly styled vehicles, such a change would generally be aesthetically unpleasing and undesirable. More importantly, the sloping roofline is often required in order to achieve the desired vehicle aerodynamics, an extremely important characteristic for an electric vehicle where increased drag translates directly to lower efficiency and thus the need for a larger battery pack in order to achieve the same vehicle performance.

Accordingly, what is needed is a battery pack system that provides improved seating ergonomics, especially for the occupants of the back seat where legroom and headroom is quite limited. The present invention provides a battery pack design that overcomes the limitations of a conventional battery pack.

SUMMARY OF THE INVENTION

The system of the present invention provides increased foot space for one or more occupants of an electric vehicle. In accordance with the invention, a foot well cavity formed within an undercarriage-mounted battery pack is aligned with the foot well corresponding to at least one of the vehicle's seats, e.g., a rear seat or a pair of rear seats. Preferably the foot well cavity extends through the battery pack to a bottom plate mounted between the battery pack and the road surface. A portion of the battery pack's batteries, contained within a first battery pack segment, are located in front of the foot well cavity while a second portion of the battery pack's batteries, contained within a second battery pack segment, are located behind the foot well cavity. The batteries contained within the first and second battery pack segments are electrically interconnected in order to achieve the desired battery pack output. Preferably the undercarriage-mounted battery pack extends substantially across the width of the electric vehicle, and substantially between the front and rear suspension assemblies.

In another aspect, the battery pack includes a bottom plate. The rear portion of the bottom plate is preferably angled away from the road surface, and more preferably angled such that the rear edge of the rear portion is further from the road surface than the front edge, where the front edge is closer than the rear edge to the front-most portion of the car. A plurality of air diffuser features, such as fins, may be incorporated into an exterior surface of the rear portion of the bottom plate.

In another aspect, the battery pack may include a plurality of cross-members running width-wise between a first battery pack side, corresponding to a first vehicle side, and a second battery pack side, corresponding to a second vehicle side. The cross-members may be interposed between battery subassemblies or incorporated into battery subassembly enclosures.

In another aspect, a plurality of conduits may be used to couple the first battery pack segment to the second battery pack segment, where the conduits may include coolant conduits and/or electrical interconnects, and may be enclosed or partially enclosed within a conduit enclosure.

A further understanding of the nature and advantages of the present invention may be realized by reference to the remaining portions of the specification and the drawings.

DESCRIPTION OF THE SPECIFIC EMBODIMENTS

In the following text, the terms "battery pack" and "battery pack enclosure" may be used interchangeably and refer to an enclosure containing one or more batteries electrically interconnected to achieve the desired voltage and capacity. The terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 2:
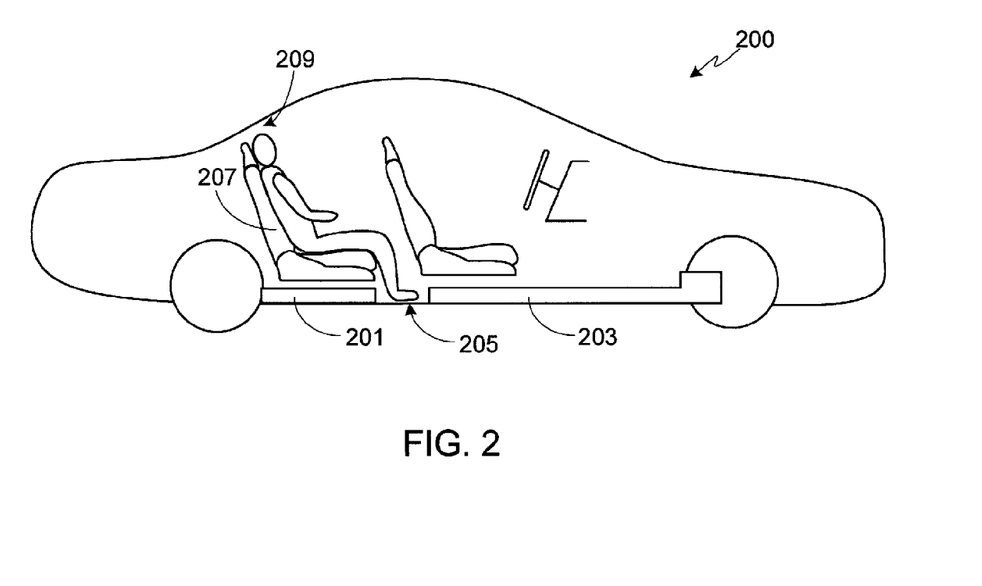
FIG. 2 provides a cross-sectional view of the vehicle shown in FIG. 1, modified to use the battery pack of the present invention in order to provide the rear seat occupant(s) with additional leg and headroom.

FIG. 2 provides a cross-sectional view of the vehicle shown in FIG. 1, modified to include the segmented battery pack of the invention. As shown, the battery pack in vehicle 200 is split into two portions 201 and 203. Battery pack segments 201 and 203 are sized and positioned such that a foot well 205 is created within the battery pack, the foot well positioned between the front and rear seats. As a result of this foot well, the occupant(s) seated in the rear vehicle seat(s) is able to sit in a more relaxed position with their feet positioned lower relative to the seat than possible in the same vehicle with a conventional undercarriage battery pack. Additionally, due to the extra foot space afforded by foot well 205, rear seat(s) 207 may be lowered, thereby creating additional headroom 209 while maintaining the same vehicle envelope and aerodynamics. Furthermore, in some instances the vehicle's roofline may be further sloped, potentially improving both vehicle aesthetics and aerodynamics while still providing improved headroom and legroom compared to an electric vehicle utilizing a conventional battery pack.

FIGS. 3-7 provide perspective views of some exemplary battery packs that utilize a segmented configuration for the undercarriage mounted pack. It will be appreciated that other designs may be used in order to meet the packaging constraints placed on the battery pack by a particular vehicle configuration and that these embodiments are simply meant to illustrate some common variations in which the common feature is the inclusion of at least one foot well cavity formed within the pack. Pack 300 is sized to traverse the width of the vehicle and extend substantially between the front and rear suspension assemblies. Located between front battery pack segment 301 and rear battery pack segment 303 is foot well cavity 305. Note that in the preferred embodiment, cavity 305 extends throughout the entire battery pack, i.e., there is no battery pack wall or panel in this region of the pack, thereby maximizing available space. In the illustrated embodiment, connecting battery pack segments 301 and 303 are a pair of coupling members 307. Further description of these battery pack coupling members is provided below.

Figure 4:
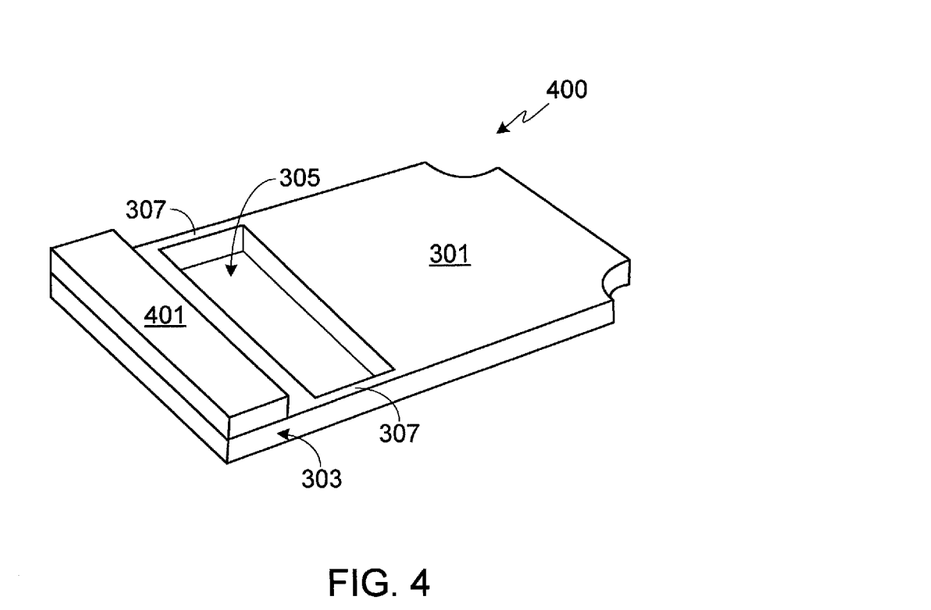
FIG. 4 provides a perspective view of an alternate battery pack, similar to the pack shown in FIG. 3, except for the addition of an extra group of batteries located above the rear portion of the pack.
Figure 5:
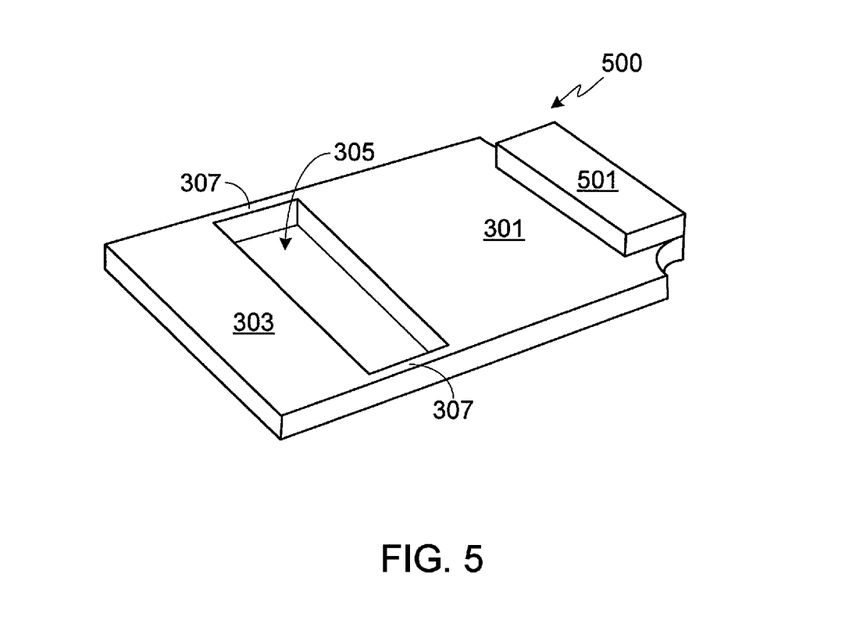
FIG. 5 provides a perspective view of an alternate battery pack, similar to the pack shown in FIG. 3, except for the addition of an extra group of batteries located above the front portion of the pack.
Figure 6:
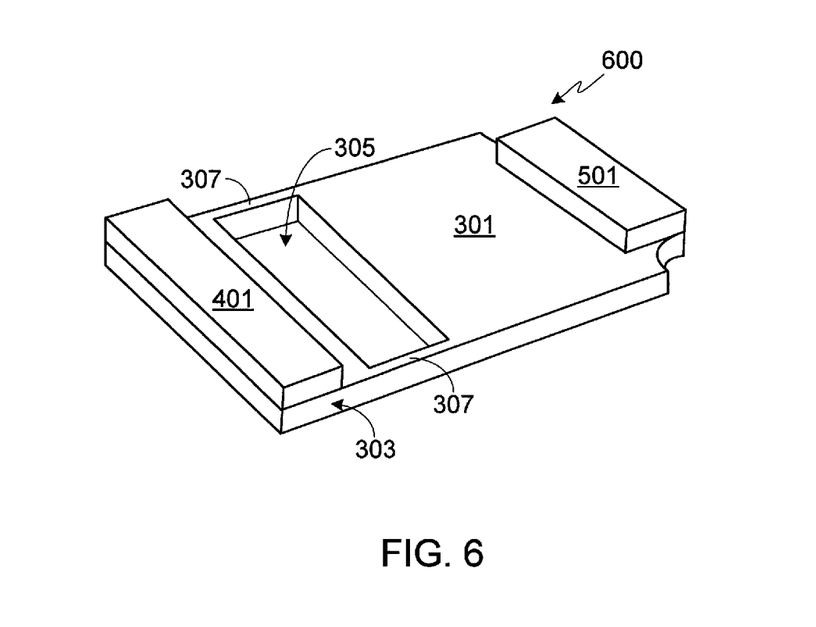
FIG. 6 provides a perspective view of an alternate battery pack, similar to the pack shown in FIG. 3, except for the addition of two extra groups of batteries, one located above the rear portion of the pack and the other located above the front portion of the pack.
Figure 7:
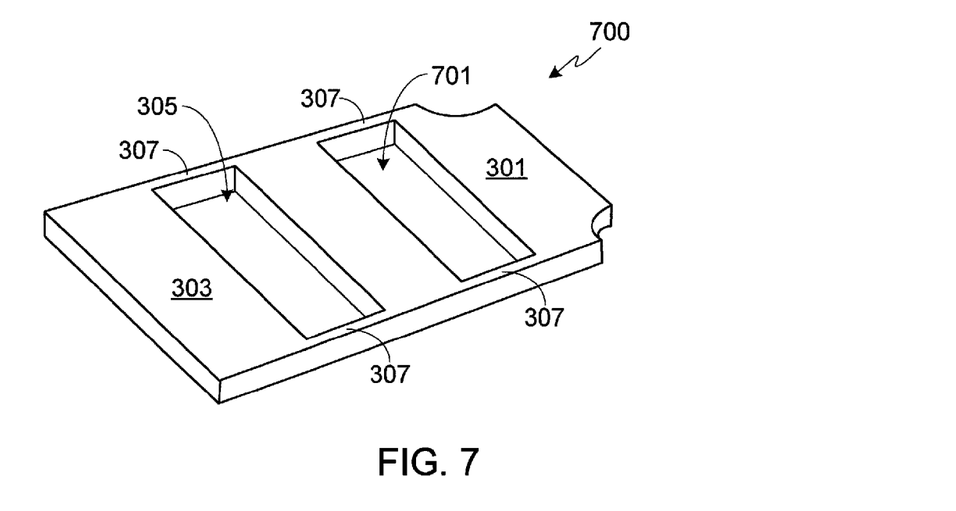
FIG. 7 provides a perspective view of an alternate battery pack, similar to the pack shown in FIG. 3, except for the addition of a second foot well cavity.

Battery pack 400, illustrated in FIG. 4, is similar to pack 300 except for the addition of another group of batteries 401 located above rear battery pack portion 303. Doubling a portion of the battery pack, as shown in pack 400, can be used to increase a battery pack's capacity (kW-h), also commonly referred to as the battery pack size, thereby improving the vehicle's range while efficiently utilizing available vehicle space. Battery pack 500, illustrated in FIG. 5, is similar to pack 300 except that additional battery group 501 is located above front battery pack portion 301. Battery pack 600, illustrated in FIG. 6, increases battery pack size by including both additional battery groups 401 and 501. Battery pack 700, illustrated in FIG. 7, is similar to battery pack 300 except for the addition of a second foot well cavity 701, preferably located to increase foot space for the front seat occupants. It will be appreciated that in a typical vehicle the additional space provided by foot well cavity 701 is unnecessary due to the legroom offered by the space under the dash.

In FIGS. 3-7, the different segments of the battery pack, i.e., battery pack portions 301 and 303, are connected via coupling members 307. Coupling members 307 provide the necessary connections between the different battery pack segments, thus combining the different segments to form a single battery pack. One of the primary connections is the power coupling that allows the batteries contained within the different segments of the battery pack to be electrically connected together, thereby achieving the desired battery pack output. Although the different battery pack segments may be individually connected to a thermal management system, typically one or more of the conduits between segments corresponds to a cooling conduit(s). Other connections may include electrical connections that couple various detectors contained within the battery pack to a vehicle monitoring system. The detectors within the battery pack may be used to monitor various battery characteristics (e.g., state-of-charge, temperature, etc.) as well as characteristics of the thermal management system (e.g., coolant temperature, coolant flow rate, etc.).

Figure 8:
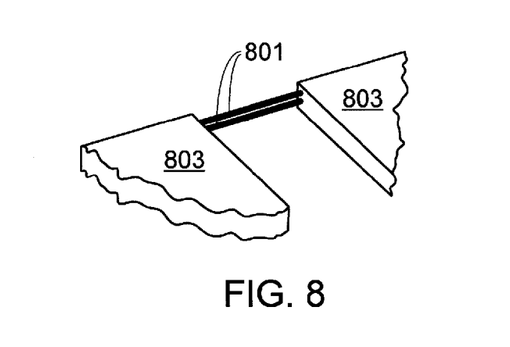
FIG. 8 provides a perspective view of a portion of a segmented battery pack, similar to the pack shown in FIG. 3, utilizing exposed coupling conduits.
Figure 9:
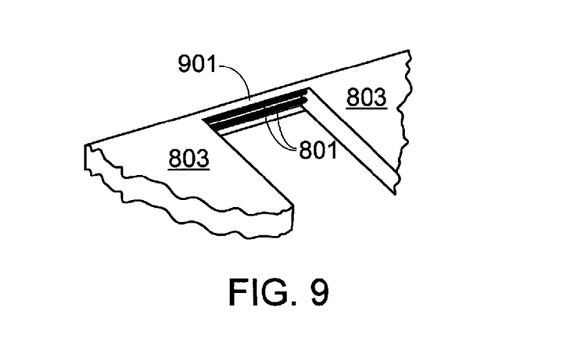
FIG. 9 provides a perspective view of the portion of the segmented battery pack shown in FIG. 8 with the coupling conduits partially enclosed.
Figure 10:
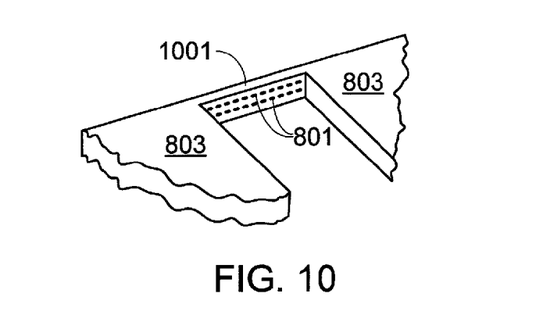
FIG. 10 provides a perspective view of the portion of the segmented battery pack shown in FIG. 8 with the coupling conduits completely enclosed.

FIGS. 8-10 illustrate the three primary means of coupling battery pack segments. In the embodiment illustrated in FIG. 8, multiple conduits 801 are sealed to each battery pack segment 803, conduits 801 being used for cooling, electrical connections, etc. as noted above. In FIG. 9, conduits 801 are partially enclosed by conduit housing 901. In FIG. 10, conduits 801 (shown in phantom) are completely enclosed by conduit housing 1001. It will be appreciated that while the elimination of a conduit housing simplifies incorporation of the multiple battery pack segments (e.g., battery portions 301 and 303) into vehicle platforms of varying size, the inclusion of a conduit housing, either a partial housing as in FIG. 9 or a complete housing as in FIG. 10, adds structural integrity to the overall battery pack structure and increases conduit protection.

Figure 11:
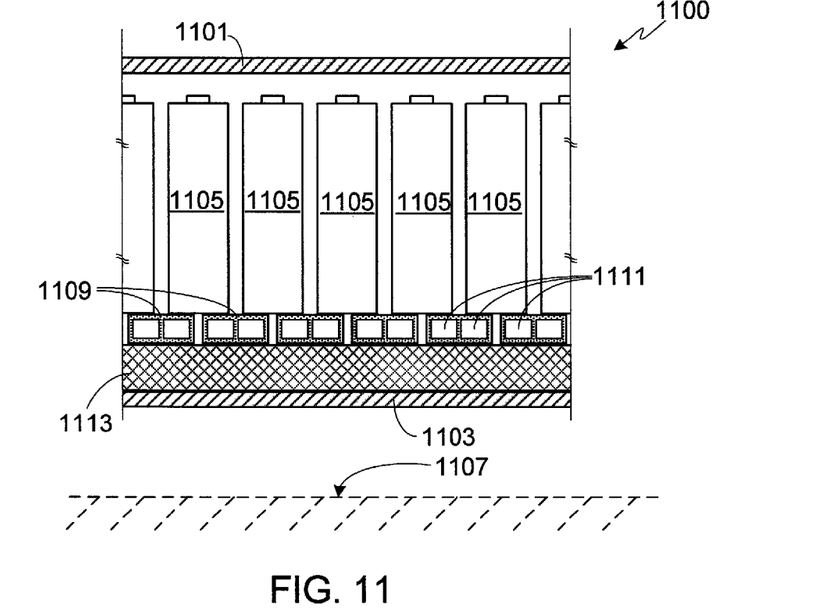
FIG. 11 provides a cross-sectional view of a portion of an exemplary battery pack suitable for use with the invention.
Figure 12:
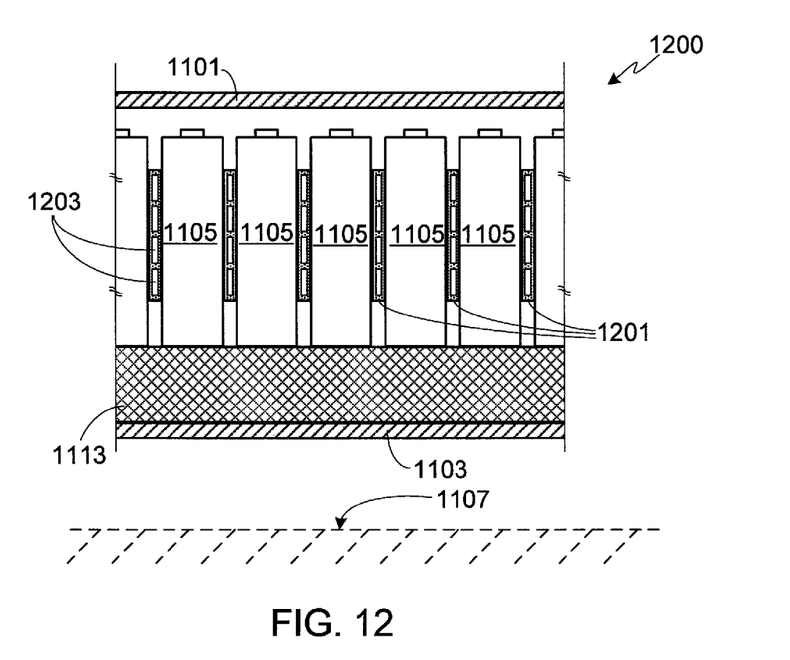
FIG. 12 provides a cross-sectional view of a portion of an alternate battery pack configuration suitable for use with the invention.

It will be appreciated that depending upon the desired battery pack capacity as well as the type and capacity of the individual batteries used to populate the battery pack, the batteries within the battery pack of the invention may be connected in parallel, series, or in a series-parallel manner. Exemplary interconnect configurations are disclosed in co-assigned U.S. patent application Ser. No. 13/794,535, filed 11 Mar. 2013, the disclosure of which is incorporated herein for any and all purposes. Similarly, the batteries of the battery pack may be stacked in any of a variety of arrangements, and cooled using any of a variety of different thermal management systems. FIGS. 11 and 12 provide cross-sectional views of exemplary battery configurations suitable for use in the battery pack of the invention. For purposes of clarity, battery interconnects and battery mounts are not included in either of these figures. Visible in these figures is a portion of an upper pack enclosure panel 1101, a portion of a lower pack enclosure panel 1103, and a plurality of batteries 1105. Note that the enclosure side panels are not visible in this view. Although the invention is not restricted to a particular battery stacking pattern or battery form-factor as noted above, in the configurations illustrated in FIGS. 11 and 12 cylindrical batteries are used, for example batteries utilizing an 18650 form-factor. In a typical configuration, the axis of each battery, i.e. the cylindrical axis, is substantially perpendicular to both lower enclosure panel 1103 and surface 1107 of the road. In battery pack configuration 1100, interposed between the base of each cylindrical battery 1105 and lower panel 1103 are a plurality of cooling conduits 1109 through which a liquid coolant, i.e., a heat transfer medium, is pumped. Alternately, and as illustrated in battery pack configuration 1200, cooling conduits 1201 are interposed between the sides of adjacent batteries 1105. In both of the illustrated configurations, the cooling conduits are aligned with lower panel 1103, resulting in the coolant within channels 1111/1203 flowing in a direction substantially perpendicular to the axes of the cylindrical batteries. By regulating the flow of coolant within conduits 1109/1201 and/or regulating the transfer of heat from the coolant to another temperature control system, the temperature of cells 1105 may be regulated so that the cells remain within their preferred operating range. As it is generally desirable to limit the unintentional transfer of thermal energy between the batteries/cooling conduits and the battery pack enclosure, preferably one or more thermally insulating layers 1113 are interposed between the batteries/cooling conduits and the battery pack enclosure as shown. Thermally insulating layer(s) 1113 may be comprised of air or some other thermally insulating material that preferably has a thermal conductivity of less than $1.0\,Wm^{-1}K^{-1}$ at 25° C., and more preferably less than $0.2\,Wm^{-1}K^{-1}$ at 25° C.

Figure 3:
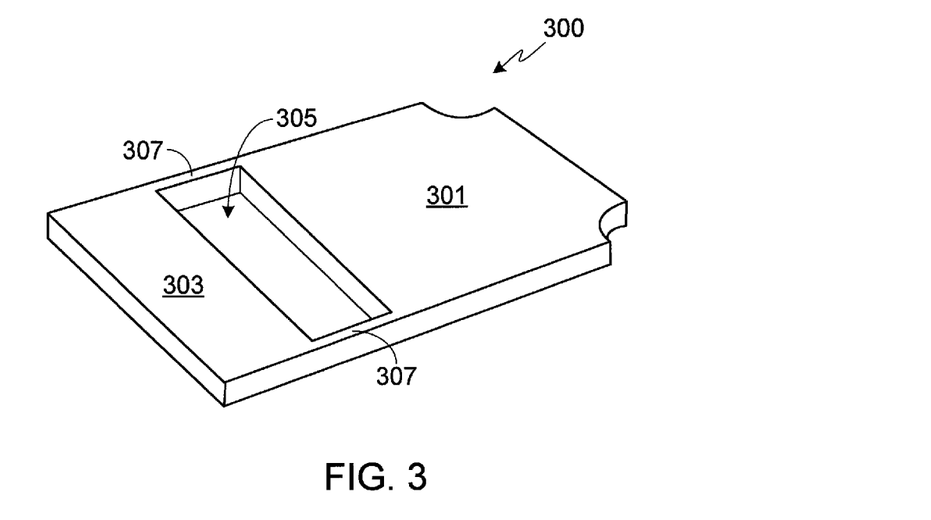
FIG. 3 provides a perspective view of an exemplary battery pack utilizing the segmented battery pack design of the invention.

Preferably the batteries within the battery pack of the invention are assembled into battery groups, also referred to herein as battery segments, thus simplifying battery pack fabrication, assembly, testing and repair. In at least one embodiment, each battery group is separately packaged, preferably utilizing the same configuration. For example, in battery pack 1300, shown in FIG. 13, a battery pack utilizing the overall design shown in FIG. 3 is comprised of five battery pack subassemblies 1301-1305. Note that subassemblies 1301-1304 are identical, while 1305 is slightly smaller due to its location within the pack. In this embodiment, each battery pack subassembly extends the full width of the battery pack. Also visible in this figure are battery pack cross-members 1307, preferably positioned between adjacent subassemblies as shown. Cross-members 1307 not only add structural integrity to the battery pack, these cross-members also substantially increase the pack's resistance to side impact damage, the type of damage that can occur when another vehicle collides with the electric vehicle incorporating pack 1300. In addition to protecting the batteries within the pack from damage, it will be appreciated that the cross-members also improve occupant safety by improving overall vehicle side impact resistance. It should be understood that while cross-members 1307 are shown interposed between each of the battery subassemblies, the battery pack may utilize fewer than this number of cross-members. Similarly, all of the cross-members need not be of the same width, thickness or even comprised of the same material.

Figure 13:
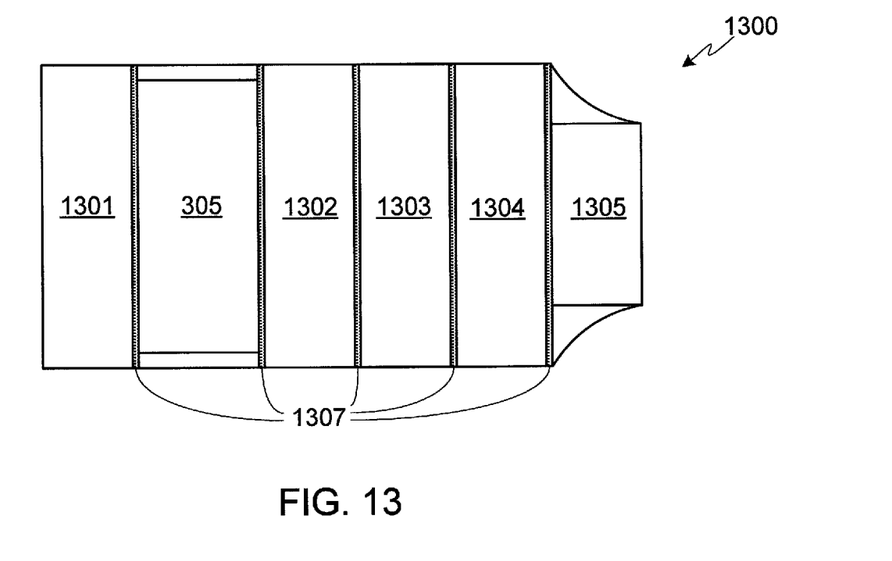
FIG. 13 provides a top view of the segmented battery pack shown in FIG. 3, with the inclusion of battery pack cross-members.
Figure 14:
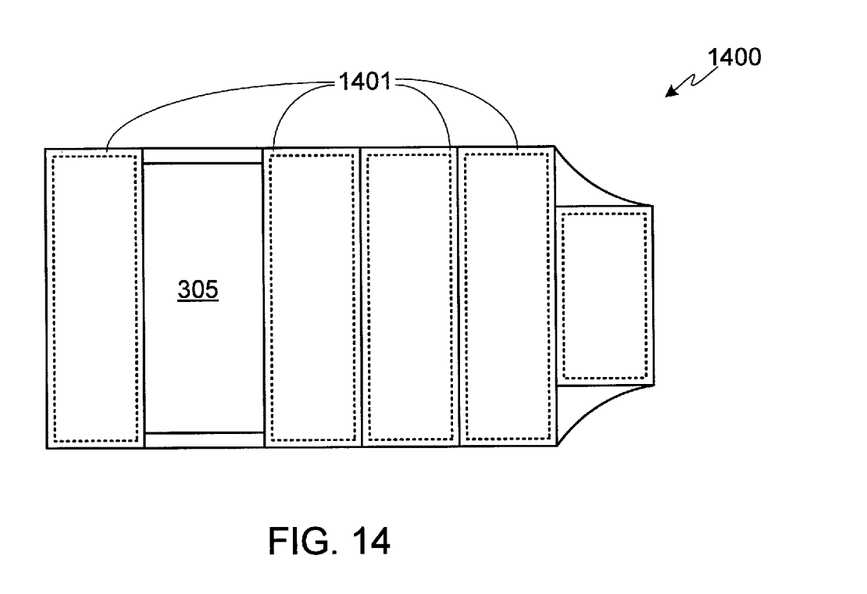
FIG. 14 provides a top view of the segmented battery pack shown in FIG. 3, with the inclusion of internal cross-members incorporated into each of the battery subassemblies.

Although the cross-members used in the battery pack are preferably separate from the battery pack subassemblies as shown in FIG. 13, thereby simplifying pack fabrication and assembly while lowering subassembly weight, in at least one embodiment the cross-members are integrated into each subassembly. Preferably the integrated cross-members are incorporated into the subassembly enclosure, for example around each subassembly's perimeter. Battery pack 1400, shown in FIG. 14, illustrates this configuration. Cross-members 1401, integrated into each battery subassembly enclosure, are shown in phantom. As in battery pack 1300, the cross-members incorporated into each battery subassembly may have varying characteristics, e.g., the cross-members that run from side-to-side may be thicker and structurally stronger than those running parallel to the longitudinal axis of the vehicle.

Figure 15:
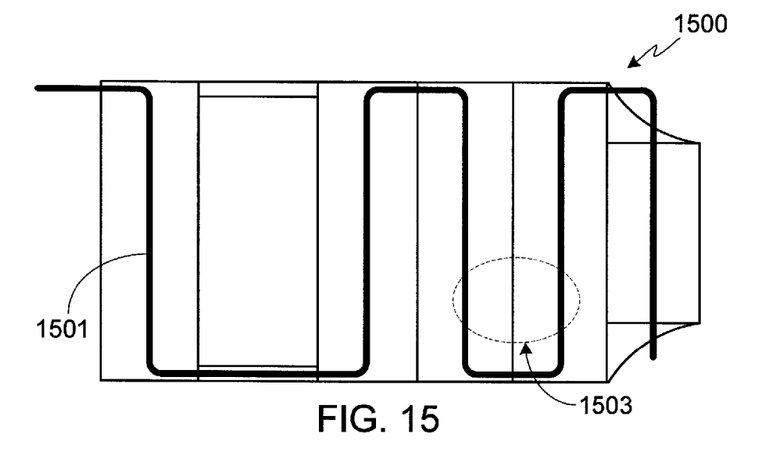
FIG. 15 provides a top view of the segmented battery pack shown in FIG. 3, with the addition of a high voltage line.
Figure 16:
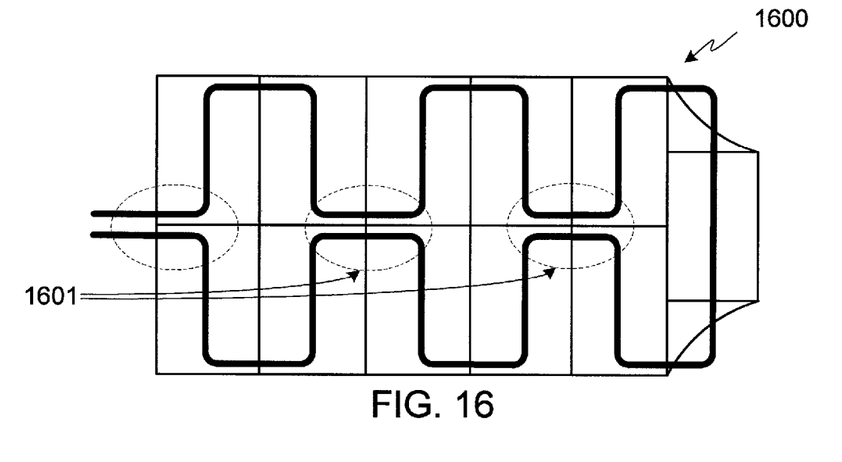
FIG. 16 provides a top view of a conventional EV battery pack, this view illustrating the large difference in electrical potential at numerous locations throughout the pack.
Figure 17:
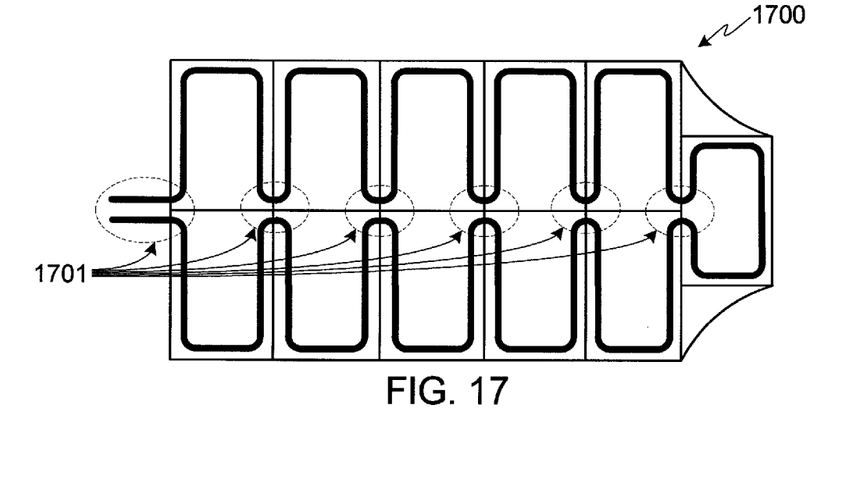
FIG. 17 provides a top view of the conventional EV battery pack shown in FIG. 16, this view illustrating an alternate wiring scheme that still results in large differences in electrical potential at numerous locations throughout the pack.

One of the advantages of using battery subassemblies that extend across the full width of the battery pack, as exemplified by packs 1300 and 1400, is that the subassemblies may be wired together to minimize the difference in electrical potential in adjacent high voltage cables. As a result, if the vehicle is in a collision, the risk of arcing is reduced. FIG. 15 illustrates the high voltage cable run in a battery pack 1500 based on the design shown in FIGS. 3 and 13. As known by those of skill in the art, and described in co-pending U.S. patent application Ser. No. 13/794,535, filed 11 Mar. 2013, while cells may be connected in parallel, groups of cells are typically connected in series in order to achieve the desired pack output. Assuming such a serial connection, the difference in electrical potential between any two points on the high voltage line 1501 is relatively small. In contrast, in a battery pack using a pair (or more) of battery subassemblies to extend across the width of the battery pack as illustrated in FIGS. 16 and 17, the difference in electrical potential between adjacent points on the high voltage line may be quite large. For example, at locations 1601 in battery pack 1600, and in locations 1701 in battery pack 1700, the difference in electrical potential would be expected to be quite large, increasing the risk of arcing in a vehicle collision. Additionally it should be noted that the physical distance at these locations is relatively small compared to a location such as 1503 in pack 1500.

Figure 18:
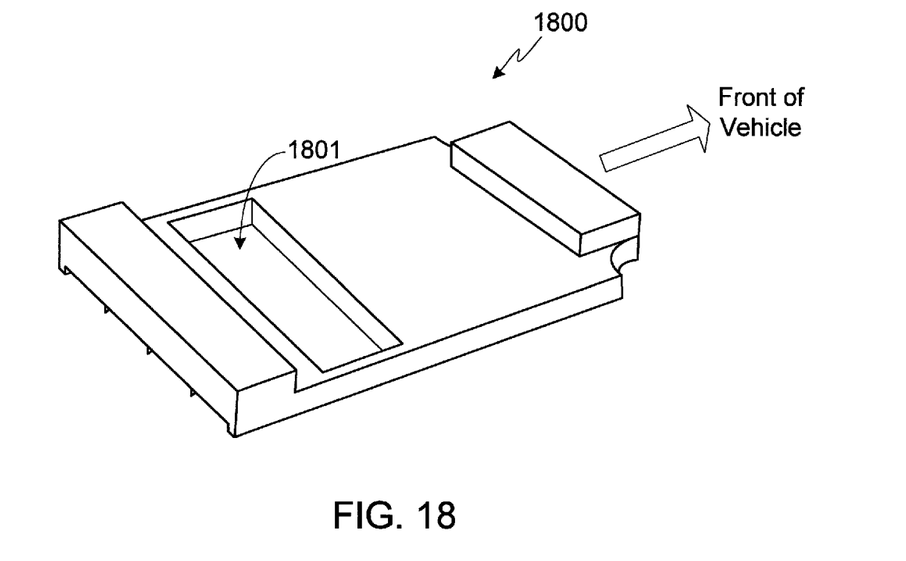
FIG. 18 provides a perspective view of the top of a battery pack in an embodiment in which the bottom surface of the pack is shaped to minimize drag and enhance the flow of air under the vehicle.
Figure 19:
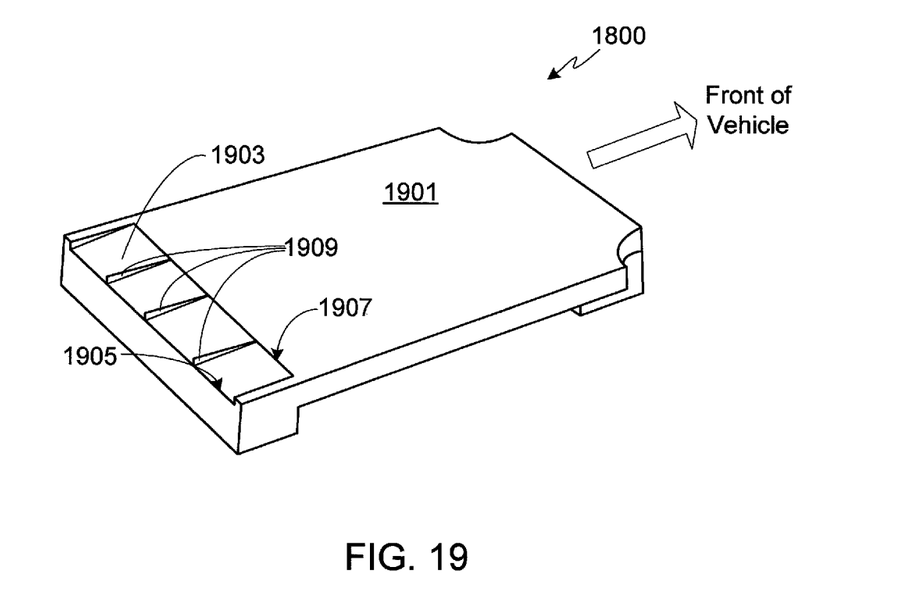
FIG. 19 provides a perspective view of the bottom of the battery pack shown in FIG. 18.

In a conventional undercarriage mounted battery pack such as that shown in FIG. 1, the pack is typically in the form of a large, relatively thin box with a planar bottom surface that includes few distinguishing characteristics. In at least one embodiment of the present invention, the pack's bottom surface is shaped in order to minimize drag and enhance the flow of air under the vehicle. FIGS. 18 and 19 illustrate this aspect of the invention with FIG. 18 providing a perspective view of the top of the battery pack, i.e., closest to the passenger compartment, and FIG. 19 providing a perspective view of the bottom of the battery pack, i.e., closest to the road surface. Viewed from the top of the pack, foot well cavity 1801 is visible. As in FIGS. 3-6, foot well cavity 1801 corresponds to the foot well in the rear of the passenger cabin and therefore is configured to provide extra foot space for occupants of the vehicle's rear seat. As shown in FIG. 19, a bottom plate 1901 covers the underside of battery pack 1800. In this embodiment, the rear portion 1903 of bottom plate 1901 is angled away from the road surface, preferably such that the rear edge 1905 of portion 1903 is further from the road surface than the front edge 1907. Preferably within the angled portion 1903 of the bottom battery pack plate are several features 1909 that further enhance air flow passing under the car. In the preferred embodiment, features 1909 consist of fins that extend away from the bottom surface of the battery pack and that are located within portion 1903 of the pack.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An electric vehicle, comprising:
   at least a first vehicle seat and a second vehicle seat, wherein said first and second vehicle seats are located within a passenger cabin of said electric vehicle, wherein said first vehicle seat corresponds to a front seat within said passenger cabin and wherein said second vehicle seat corresponds to a rear seat within said passenger cabin, wherein a first foot well corresponds to said first vehicle seat and a second foot well corresponds to said second vehicle seat, and wherein said second foot well is located between said first vehicle seat and said second vehicle seat;
   a battery pack mounted under said electric vehicle, wherein said battery pack is contained within a single battery pack enclosure, wherein said single battery pack enclosure extends from under said first vehicle seat to under said second vehicle seat, said single battery pack enclosure configured to house a plurality of batteries, wherein said plurality of batteries are divided within said single battery pack enclosure into a plurality of battery pack segments; and
   a foot well cavity formed within said single battery pack enclosure, wherein said foot well cavity is devoid of battery pack segments, wherein said foot well cavity is aligned with said second foot well, wherein a first battery pack segment of said plurality of battery pack segments is located in front of said foot well cavity within said single battery pack enclosure and a second battery pack segment of said plurality of battery pack segments is located behind said foot well cavity within said single battery pack enclosure, and wherein said plurality of batteries within said first battery pack segment are electrically connected to said plurality of batteries within said second battery pack via a plurality of electrical interconnects enclosed within said single battery pack enclosure.

2. The electric vehicle of claim 1, wherein said single battery pack enclosure substantially extends across a width corresponding to said electric vehicle and substantially extends between a front suspension assembly and a rear suspension assembly of said electric vehicle.

3. The electric vehicle of claim 1, further comprising a bottom plate mounted beneath said single battery pack enclosure and between said single battery pack enclosure and a road surface.

4. The electric vehicle of claim 3, wherein said foot well cavity extends through said single battery pack enclosure to said bottom plate.

5. The electric vehicle of claim 1, said single battery pack enclosure further comprising a bottom plate, wherein a rear portion of said bottom plate is angled away from a road surface underlying said electric vehicle.

6. The electric vehicle of claim 5, wherein a rear edge of said rear portion of said bottom plate is further from said road surface than a front edge of said rear portion of said bottom plate, wherein said front edge is closer than said rear edge to a front-most portion of said electric vehicle.

7. The electric vehicle of claim 5, further comprising a plurality of air diffuser features incorporated into an exterior surface of said rear portion of said bottom plate.

8. The electric vehicle of claim 7, said plurality of air diffuser features comprising a plurality of fins positioned in parallel with a longitudinal vehicle axis.

9. The electric vehicle of claim 1, said single battery pack enclosure further comprising a plurality of cross-members running width-wise between a first single battery pack enclosure side and a second single battery pack enclosure side, wherein said first single battery pack enclosure side corresponds to a first vehicle side and said second single battery pack enclosure side corresponds to a second vehicle side.

10. The electric vehicle of claim 9, wherein each of said plurality of cross-members is interposed between a pair of said battery pack segments.

11. The electric vehicle of claim 1, said single battery pack enclosure further comprising at least one conduit coupling said first battery pack segment to said second battery pack segment, wherein said plurality of electrical interconnects are at least partially enclosed within said at least one conduit.

12. The electric vehicle of claim 11, wherein said at least one conduit further comprises at least one coolant conduit.

* * * * *